(12) United States Patent
Pasala et al.

(10) Patent No.: US 8,745,216 B2
(45) Date of Patent: Jun. 3, 2014

(54) SYSTEMS AND METHODS FOR MONITORING AND CONTROLLING A SERVICE LEVEL AGREEMENT

(75) Inventors: Anjaneyulu Pasala, Bangalore (IN); Sumit Kumar Bose, Delhi (IN); Ganesan Malaiyandisamy, Bangalore (IN); Sridhar Murthy Jayaram, Bangalore (IN)

(73) Assignee: Infosys Limited, Bangalore (IN)

( * ) Notice: Subject to any disclaimer, the term of this patent is extended or adjusted under 35 U.S.C. 154(b) by 185 days.

(21) Appl. No.: 13/424,335

(22) Filed: Mar. 19, 2012

(65) Prior Publication Data
US 2013/0132561 A1 May 23, 2013

(51) Int. Cl.
*G06F 15/173* (2006.01)

(52) U.S. Cl.
USPC .......................................................... 709/224

(58) Field of Classification Search
CPC ... H04L 29/08072; H04L 29/06; H04L 43/00; H04L 12/2602; H04L 41/22
USPC .......................................................... 709/224
See application file for complete search history.

(56) References Cited

U.S. PATENT DOCUMENTS

| 8,516,249 | B2* | 8/2013 | Robb et al. ...................... 713/167 |
| 2011/0138047 | A1* | 6/2011 | Brown et al. .................. 709/226 |
| 2011/0216651 | A1* | 9/2011 | Bansal et al. .................. 370/235 |
| 2011/0238458 | A1* | 9/2011 | Purcell et al. .................. 705/7.27 |
| 2011/0289198 | A1* | 11/2011 | Isaacson et al. ............... 709/221 |
| 2012/0102193 | A1* | 4/2012 | Rathore et al. ................. 709/224 |
| 2012/0137003 | A1* | 5/2012 | Ferris et al. .................... 709/226 |
| 2012/0197968 | A1* | 8/2012 | Korovin et al. ................ 709/203 |
| 2012/0198036 | A1* | 8/2012 | Korovin et al. ................ 709/223 |
| 2013/0227137 | A1* | 8/2013 | Damola et al. ................. 709/224 |

* cited by examiner

*Primary Examiner* — David Lazaro
*Assistant Examiner* — Mahran Abu Roumi
(74) *Attorney, Agent, or Firm* — Stephen M. Hertzler; Marc S. Kaufman; Reed Smith LLP

(57) ABSTRACT

Methods and systems for monitoring and controlling a service level agreement are disclosed. A disclosed embodiment comprises a cloud platform hosting at least one application associated with at least one service level agreement, a monitoring module for collecting at least one metric relating to an application hosted on the cloud platform and terms of a service level agreement associated with each of the one or more metrics, and monitoring the metric collected against a service level objective in the service level agreement. The system may additionally comprise a controlling module for mapping a service level objective to a predefined operation rule, identifying one or more actions to be taken in accordance with the rule, assigning a priority to the one or more actions identified in accordance with the rule; and performing the one or more actions in accordance with the assigned priority of each of the one or more actions.

29 Claims, 6 Drawing Sheets

US 8,745,216 B2

SYSTEMS AND METHODS FOR MONITORING AND CONTROLLING A SERVICE LEVEL AGREEMENT

RELATED APPLICATION DATA

This application claims priority to Indian Patent Application No. 3942/CHE/2011, filed Nov. 17, 2011, which is hereby incorporated by reference in its entirety.

FIELD

The invention relates generally to the monitoring of a service level agreement in a cloud platform. In particular, the invention relates to the monitoring of one or more metrics related to an application hosted on a cloud platform for compliance with a service level agreement associated with the application.

BACKGROUND

Typically, in the service hosting arena, service providers and customers enter into an agreement that governs the usage of services offered by the cloud platform provider. These agreements are called Service Level Agreements (SLAs). SLAs, in turn, consist of several service level objectives (SLO). SLOB are usually defined based on certain key criteria linked to the service provider, such as, for example, criteria relating to usage of storage or compute resources. With the increasing complexity of cloud platform architectures and their associated management processes, this list of key criteria has grown, and the associated difficulty of identifying and quantifying them has grown in turn.

Along with the growth in computing hardware capability, the number and complexity of web applications has risen, while, at the same time, application hosting has become an increasingly important service offered by cloud platform providers as enterprises realized that it was economical to outsource application hosting activity. Procuring expensive hardware upfront, without knowing the viability of the hosting business, is a significant risk that enterprises were, and are, not willing to take. In essence, by being allowed the flexibility to categorize hardware and application maintenance as non-core activities of their business, enterprises are able to concentrate resources on improving other aspects of their applications, such as user experience and functionality. Accordingly, the level of sophistication required to manage these data centers, or cloud platforms, where numerous applications could be hosted simultaneously increased manifold, along with the cost of maintaining them.

Additionally, it is desirable that service level agreements (SLA) are specific to an application being hosted. In large scale cloud platforms, it is rarely the case that a single SLA is defined for a disparate set of applications that share the same resources. To this end, an overall integrated, framework for deriving a governing SLA and its automated management is desirable. Such an SLA would take into account individual application characteristics while maximizing overall usage of cloud resources under a common set of governing policies.

Effective operationalization of such an SLA framework necessarily includes a mechanism for the management of the service level objectives defined therein, and may consequently include SLA monitoring and controlling mechanisms or policies whereby the SLA is monitored for compliance. Traditionally, load balancing techniques and admission control mechanisms have been used to secure a guaranteed quality of service (QoS) for a given SLA associated with a hosted application.

In one previous approach, load balancing techniques may be used to manage SLO requirements. The objective of such load balancing is to distribute incoming requests related to the hosted application onto a set of physical machines, each hosting a replica of an application, so that the load on the physical machines is equally distributed. Load balancing algorithms may execute on a physical machine that interfaces with a client or a client system. This physical machine, also called the front-end node, receives incoming requests and distributes these requests to different physical machines for further execution. The set of physical machines to which the requests are distributed are responsible for serving incoming requests, and are known as back-end nodes.

However, typically, the one or more algorithms executing on the front-end node are agnostic to the nature of the request. This means that the front-end node is neither aware of the type of client from which the request originates, nor aware of the category, such as browsing, sales, payment etc., to which the request belongs. This category of load balancing algorithms is known as class-agnostic. There is a second category of load balancing algorithms that is known as class-aware. With class-aware load balancing and requests distribution, the front-end node must additionally inspect the type of client making the request or the type of service requested before deciding which back-end node should service the request. However, inspecting a request to find out the class or category of a request is difficult because the client must first establish a connection with a node that is not responsible for servicing the request, i.e. a front-end node.

In another previous approach, admission control mechanisms may be used to manage SLO requirements. Admission control algorithms play an important role in deciding which set of requests should be admitted into the application server when the server experiences very heavy loads. During overload situations, since the response time for all the requests would invariably degrade if all the arriving requests are admitted into the server, it would be preferable to be selective in identifying a subset of requests that should be admitted into the system. The objective of admission control mechanisms, therefore, is to police incoming requests and identify a subset of incoming requests that can be admitted into the system when the system faces overload situations.

A disadvantage with this approach is that a client session may consist of multiple requests that are not necessarily unrelated. Consequently, some requests are rejected. Furthermore, the decision to reject a request can depend on the type of user making the request or the nature of the request being made. For example, a new request or a new session initiated by a high-priority user may be admitted while the requests from low priority users are rejected. Similarly, requests that are likely to consume more system resources can be rejected during overload situations.

Accordingly, there is a need for an effective service level agreement operationalization scheme, that may include means for monitoring and controlling the integrated service level agreement, for an application hosted on a cloud platform whereby the utilization of cloud infrastructural resources with respect to demand is optimized.

SUMMARY

The present invention discloses a system for monitoring and controlling a service level agreement. The system described herein comprises a cloud platform that hosts at least one application associated with at least one service level agreement. The cloud platform additionally comprises at least one physical computing unit, at least one networking unit and at least one physical storage unit. Further, in accordance with a described embodiment, a processor in the cloud platform is in operable communication with a processor readable storage medium that contains one or more programming instructions whereby the processor is configured to implement a monitoring module configured to collect at least one metric relating to an application hosted on the cloud platform, and terms of a service level agreement associated with each of the one or more metrics. It is additionally configured to monitor the at least one metric collected against at least one service level objective in the service level agreement, wherein the at least one service level objective is a parameter in the service level agreement that is selected from a group consisting of business and infrastructural parameters related to the cloud platform. It is further configured to implement a controlling module, the controlling module configured to map a service level objective to a predefined operation rule, identify one or more actions to be taken in accordance with the predefined operation rule; assign a priority to the one or more actions identified in accordance with the predefined operation rule; and perform the one or more actions in accordance with the assigned priority of each of the one or more actions, wherein such performing includes provisioning infrastructural resources associated with the cloud platform.

An additional implementation of the invention disclosed herein includes a computer implemented method for monitoring and controlling a service level agreement, the method comprising collecting at least one metric relating to an application hosted on a cloud platform, said cloud platform hosting at least one application associated with at least one service level agreement, and comprising at least one physical computing unit, at least one networking unit and at least one physical storage unit, with terms of a service level agreement additionally associated with each of the one or more metrics related to the hosted application. It further includes monitoring the at least one metric collected against at least one service level objective in the service level agreement, wherein the service level objective is a parameter in the service level agreement that is selected from a group consisting of business and infrastructural parameters related to the cloud platform, mapping a service level objective to a predefined operation rule, identifying one or more actions to be taken in accordance with the predefined operation rule, assigning a priority to the one or more actions identified in accordance with the predefined operation rule, and performing the one or more actions in accordance with the assigned priority of each of the one or more actions, wherein performing includes provisioning infrastructural resources associated with the cloud platform.

DRAWINGS

These and other features, aspects, and advantages of the present invention will be better understood when the following detailed description is read with reference to the accompanying drawings in which like characters represent like parts throughout the drawings, wherein.

Figure 1:
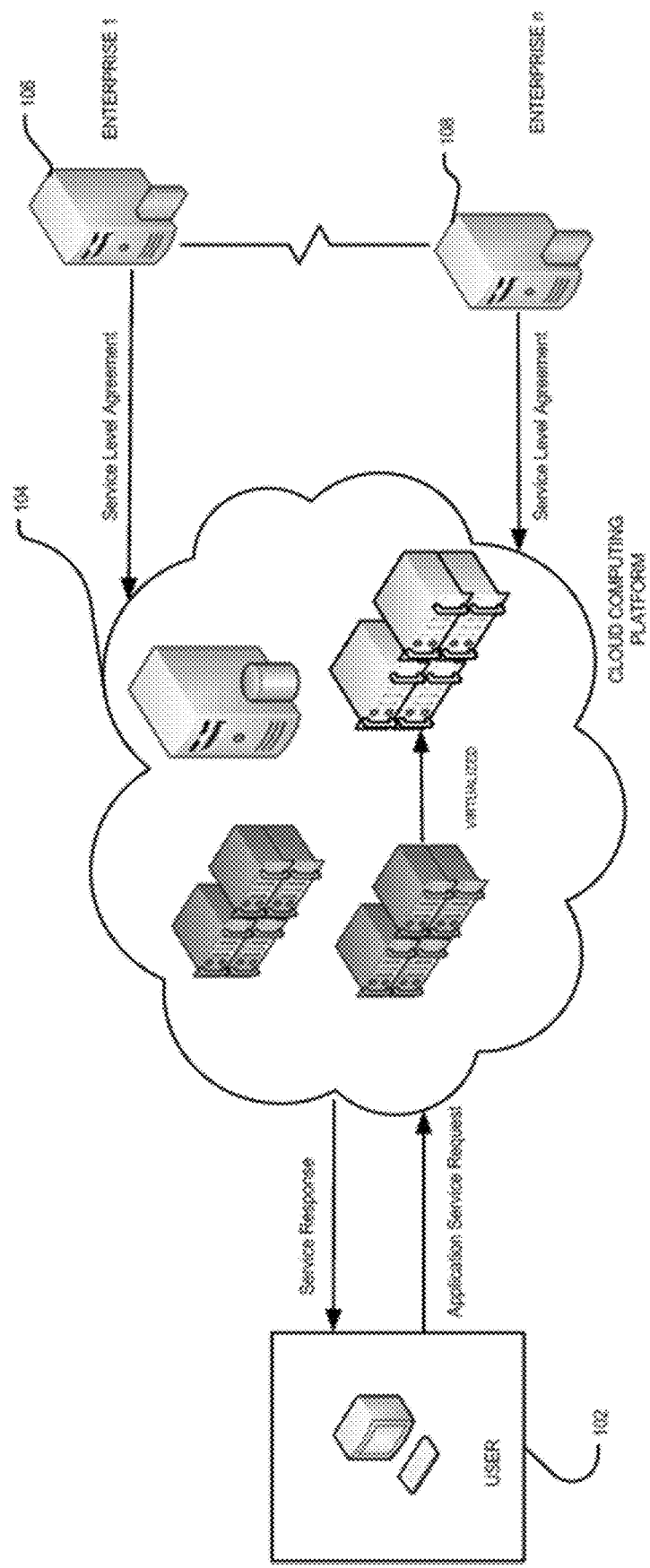
FIG. 1 is a diagram depicting the dedicated hosting of enterprise applications on a cloud platform.

While systems and methods are described herein by way of example and embodiments, those skilled in the art recognize that systems and methods for monitoring and controlling a service level agreement are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments relate to systems and methods for monitoring and controlling a service level agreement for an application in a cloud platform.

Each Service Level Agreement (SLA) that is associated with a hosted application on a cloud platform goes through a sequence of steps over the course of its implementation, starting from, firstly, the identification of terms and conditions, and secondly, the activation and monitoring of the stated terms and conditions, and, finally, eventual termination of contract once the hosting relationship ceases to exist. Such a sequence of steps may generally be called the SLA life cycle. The SLA life cycle, then, may generally be said to consist of the following stages:

(1) Contract definition, (2) Publishing and discovery, (3) Negotiation, (4) Operationalization, and (5) De-commissioning.

In the contract derivation stage, generally, cloud service providers define a set of service offerings and corresponding SLAs using standard templates. These service offerings may form a catalog, and individual SLAs for enterprises may be derived by customizing these base SLA templates.

In the publication and discovery stage, a cloud service provider may advertise its base service offerings through standard publication media, allowing customers to locate the service provider thereby.

In the negotiation stage, once a customer has discovered a service provider who can meet an application hosting need, terms and conditions for an SLA may be mutually agreed upon before hosting the application. For a standard packaged application which is offered as service, this phase could be automated. For customized applications that are hosted on cloud platforms, this phase is manual. In this stage, the service provider may analyze the application's behavior with respect to scalability and performance before agreeing on the specification of SLA. At the end of this phase, the SLA is mutually agreed upon by both customer and provider and is eventually signed off.

In the de-commissioning stage, all activities performed under a particular SLA when the hosting relationship between the service provider and the service consumer has ended are terminated. The agreed upon SLA may specify the terms and conditions of contract termination and, additionally, situations under which the relationship between a service provider and a service consumer can be considered to be legally ended.

The operationalization stage, then, is a key determinant of the effectiveness of any SLA implementation for a hosted application. In some embodiments of the disclosed implementation, SLA operationalization may consist of SLA policy formulation, monitoring, controlling, and accounting. SLA monitoring may involve measuring parameter values and calculating metrics defined as a part of the SLA, and determining deviations therefrom. Controlling may include the implementation of one or more policy enforcement engines. Finally, SLA accounting may involve capturing and archiving adherence to the agreed upon SLA, in order to measure compliance rates.

Figure 4:
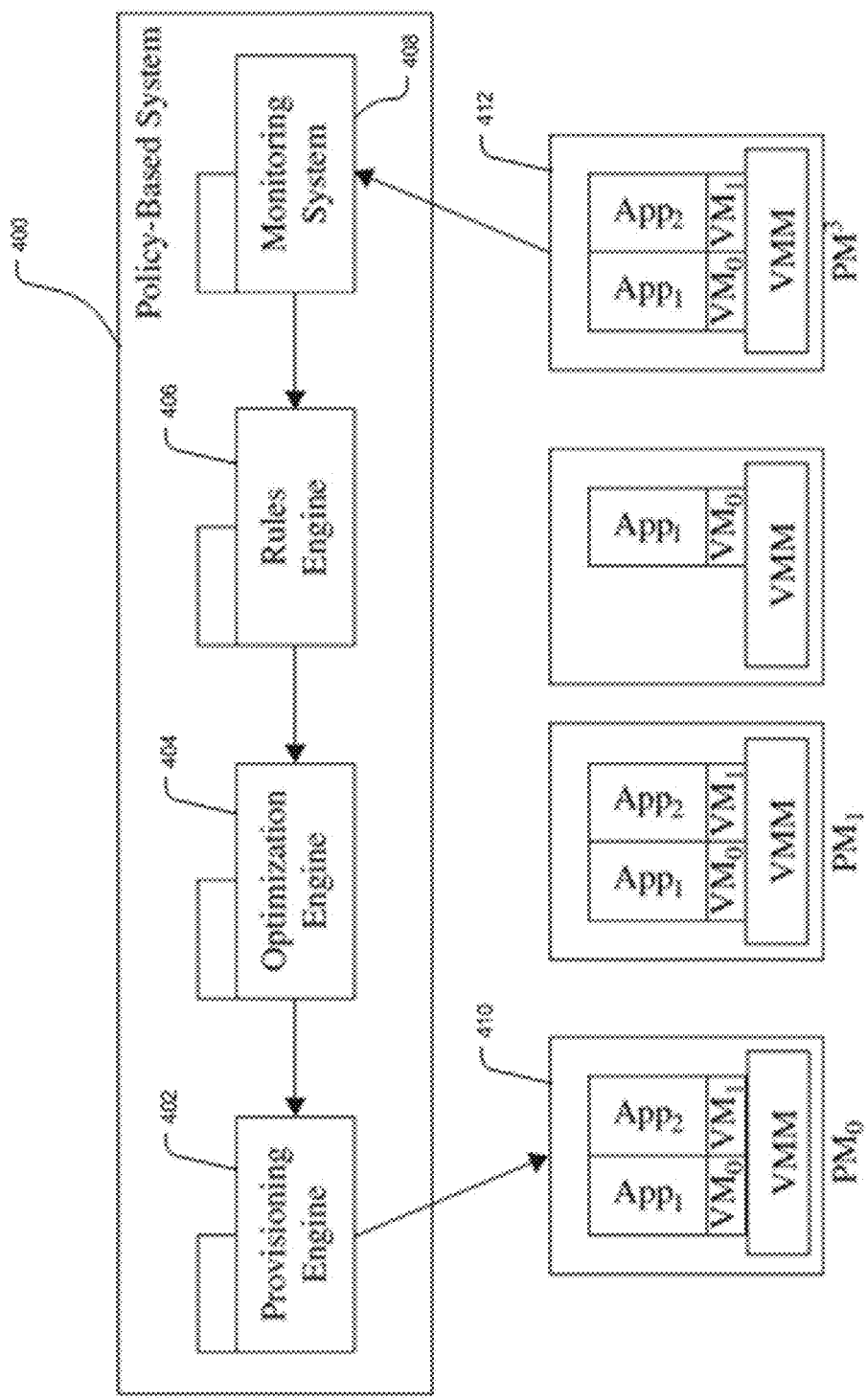
FIG. 4 is an illustrative diagram of a policy based automated management system, in accordance with an embodiment.

Once the customer agrees to the set of SLOs and the cost, the Application Service Provider may create different operationalization policies that, taken together, may serve as a framework for automated management of the application. These policies may, in some embodiments of the disclosed invention, include three types: (1) business, (2) operational, and (3) provisioning. In a policy based automated management framework, this implies that the management system should automatically infer the amount of system resources that should be allocated or de-allocated to, or allocated or de-allocated from, the appropriate components of the application when load on the cloud platform increases or decreases. In accordance with an embodiment, in FIG. 4, a policy based system 400 comprising a monitoring system 408 in communication with a rules engine 406, an optimization engine 404, and a provisioning engine 402, which, together, serve to implement an automated management framework for one or more applications hosted on a cloud platform comprising a plurality of virtual machines 410 to 412, is depicted. In some embodiments, the policy based system may additional comprise a prioritization engine.

Figure 5:
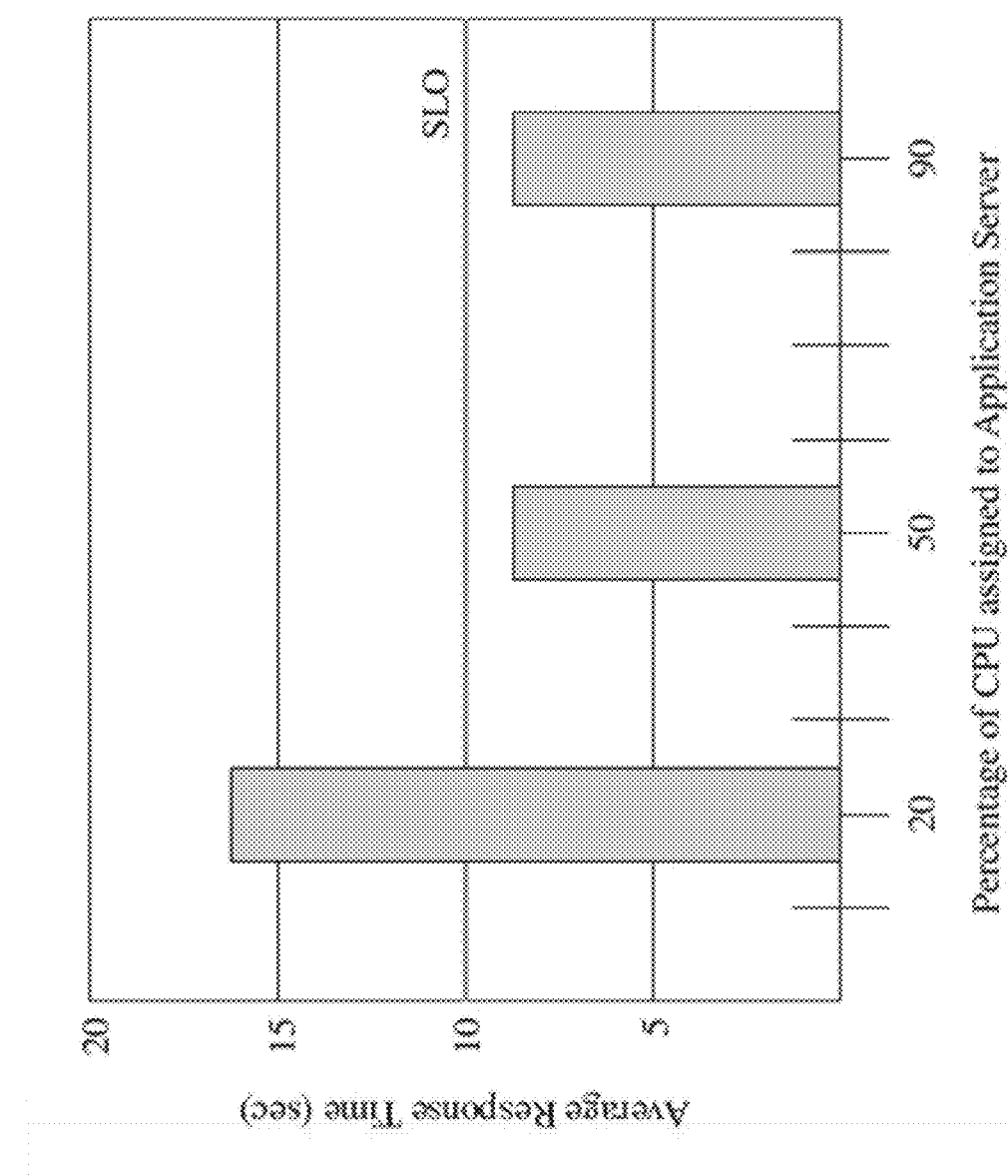
FIG. 5 is a graphical representation of the performance of an application for a varied allocation of compute resources.
Figure 6:
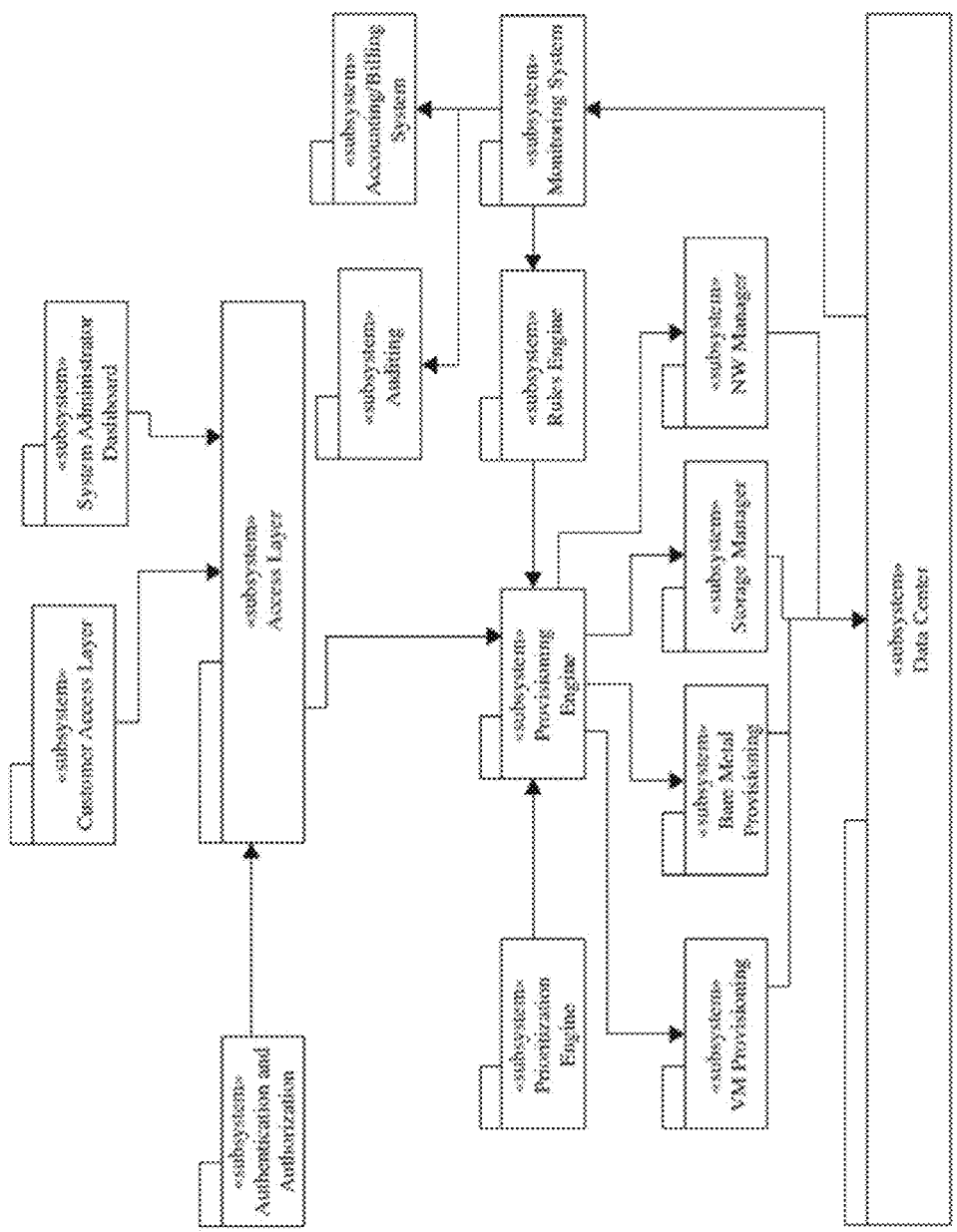
FIG. 6 is an illustrative diagram of a policy based system comprising a provisioning engine, a prioritization engine, a rules engine, a monitoring system, an auditing subsystem and an accounting/billing subsystem, in accordance with an embodiment.

Specifically, policies may specify the sequence of actions to be performed under a variety of circumstances. For example, operational policies specify the functional relationship between the system level infrastructural attributes and the business level SLA goals. Knowledge of such a relationship may help in identifying the quantum of system resources to be allocated to the various components of the application for different system attributes at various workloads, workload compositions, and operating conditions, so that the SLA goals are met. FIG. 5 depicts the importance of such a relationship. For example, consider a three-tier web application consisting of web server, application server, and database server. Each of the servers is encapsulated using a virtual machine and is hosted on virtualized servers. Furthermore, assume that the web tier and the database tier of the application have been provisioned with sufficient resources at a particular work-load. The effect of varying the system resources (such as CPU) on the SLO, which in this case is the average response time for customer requests, is shown in FIG. 5.

In accordance with an embodiment then, an operationalization environment of a Service Level Agreement is illustrated with reference to, firstly, FIG. 1, wherein an Application Service Provider (ASP) providing large scale application hosting on a cloud platform, 104, is depicted. The cloud platform 104 comprises one or more physical servers and one or more virtual machines, or platforms that run on the one or more physical servers. In this instance, the cloud platform is able to support a plurality of applications from each of a plurality of enterprises, as in 106 and 108. Each of the enterprises may have an agreed upon SLA with the ASP which determines the conditions under which the applications are hosted. The SLA, in turn, affects the user experience in terms of, for example, service response time when an application service request is received from a user, as in 102.

Figure 2:
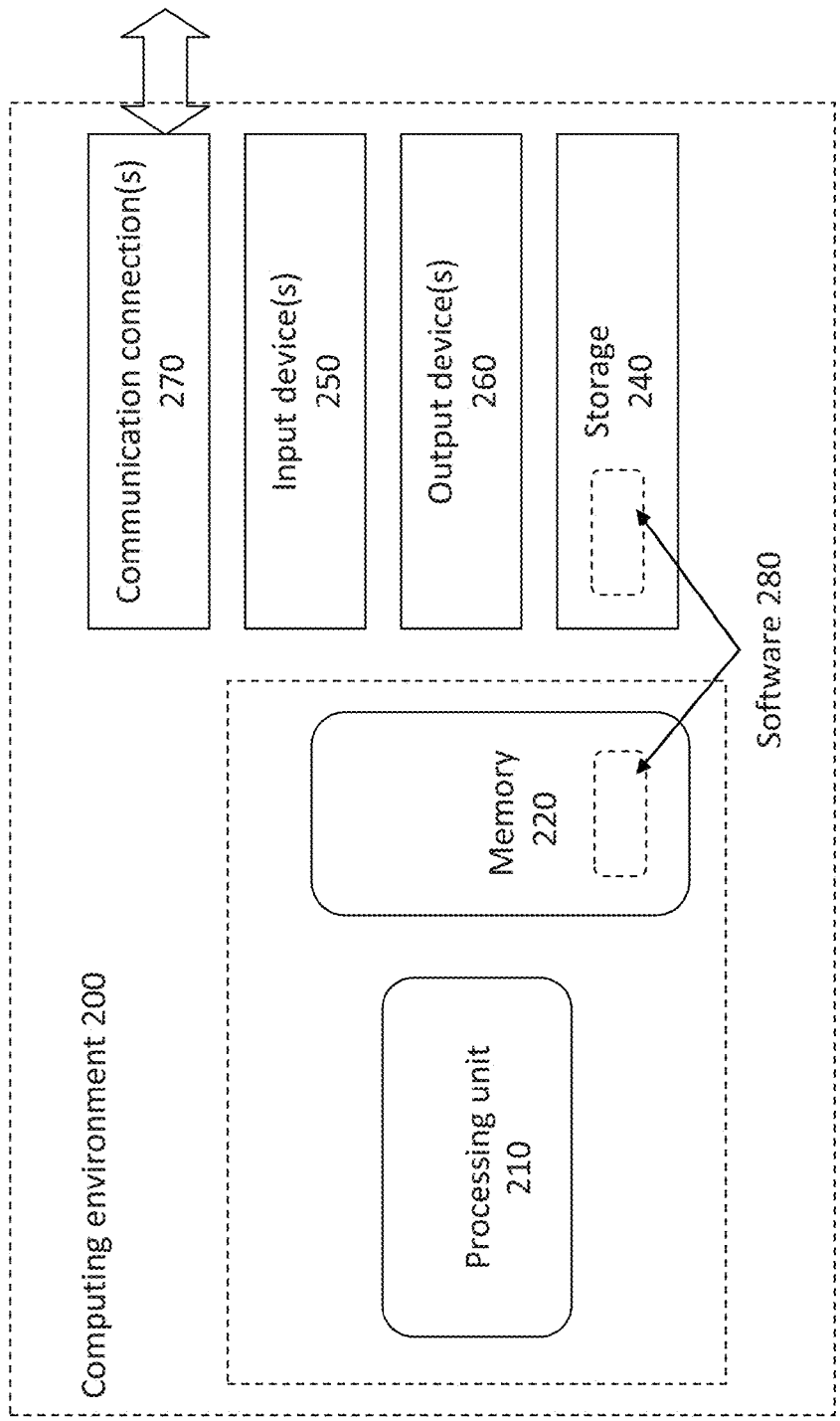
FIG. 2 is an illustrative architecture diagram of a computing environment in which a service level agreement is derived.

The implementation environment for the operationalization of a service level agreement specific to both an application and the ASP's cloud platform on which the application is to be deployed is further detailed with reference to FIG. 2, wherein a computing environment 200 where a service level agreement may be operationalized is depicted, the computing environment comprising a processing unit 210, a communication connection 270, an input device 250, an output device 260, and a processor readable storage medium 240, in operable communication with the processing unit 210, is depicted. The computing environment may run a software 280, the software 280 stored on the computer readable storage medium, and consisting of one or more programming instructions stored in the processor readable storage medium, the programming instructions suitable for monitoring and controlling a service level agreement for a cloud platform.

Figure 3:
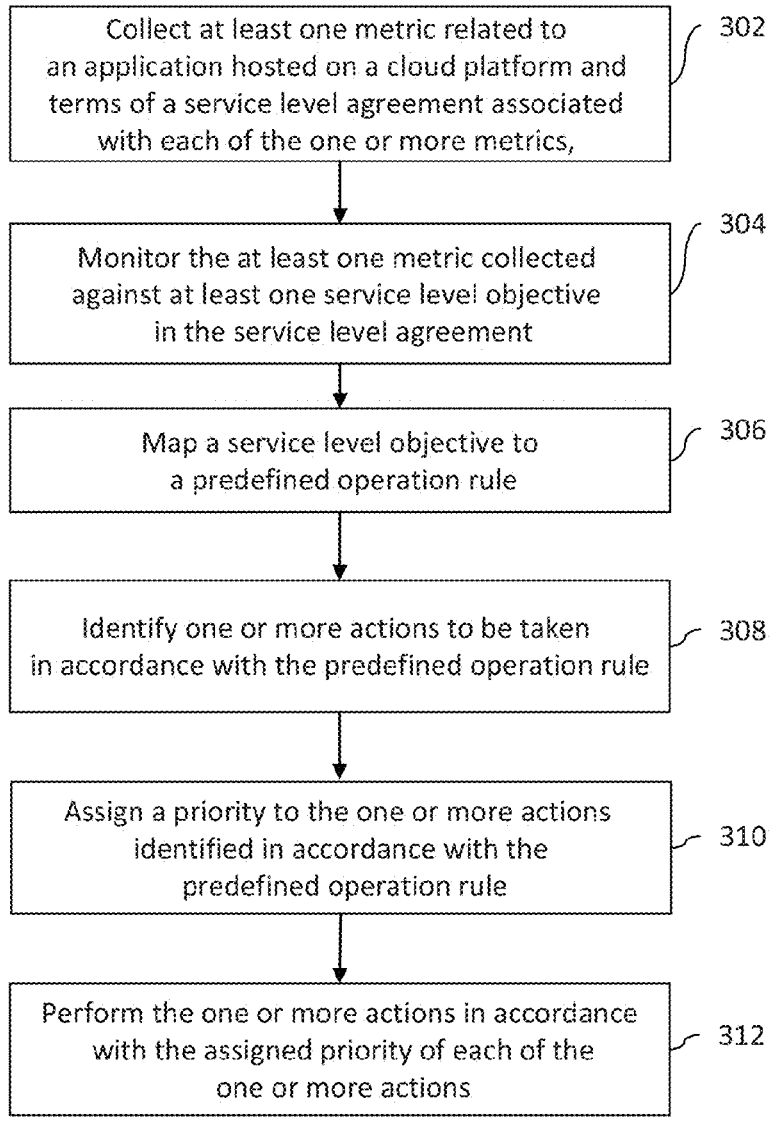
FIG. 3 is an illustrative flow diagram depicting a method of monitoring and controlling the implementation of a service level agreement for an application hosted on a cloud platform.

In accordance with an embodiment that may be implemented in the computing environment 200, steps in the operationalization of a service level agreement involve the monitoring and controlling of the service level agreement. Referring now to FIG. 3, a first monitoring step involved therein is the collection of at least one metric relating to an application hosted on the cloud platform, and terms of a service level agreement associated with each of the one or more metrics, as in 302. Then, as in a step 304, the at least one metric collected is monitored against at least one service level objective in the service level agreement.

Once an application begins execution, it may be continuously monitored by the monitoring system. Application metrics, or parameters, monitored may be related to resource failures, operational policies, performance and availability of the hosted applications, and the performance and availability of the hosting cloud platform. Once these parameters are collected they may be compared against a service level objective threshold in an associated SLA. If a parameter meets the corresponding defined threshold, the parameter is stored in a database. Recorded parameters may serve as evidence of adherence to the service level agreement, and the data may subsequently be reused for auditing or billing. If a parameter fails to meet a corresponding defined threshold, it is recorded and a controlling unit is triggered in order to recommend an action to enforce compliance.

An implementation of the controlling module is further described with reference to the step 306 of FIG. 3, where a service level objective is mapped to a predefined rule. Then, as in a step 308, one or more actions to be taken in accordance with the predefined operation rule are identified.

In the embodiments disclosed, the one or more policies defined may be implemented by means of one or more policy engines, or modules, including, for example, a rules engine. The operation policy defines a sequence of actions to be enacted under different conditions/trigger points. The rules engine may evaluate data captured by the monitoring system, compare said data against one or more predefined operation rules, and trigger an associated action, if such is required. The operation of a rules engine on the basis of a defined operational policy is important in guaranteeing an SLA under a self-healing system.

More specifically, a rules engine evaluates a possible SLA violation on the basis of rules which are defined based on one or more service level objectives (SLOs). As in some embodiments, an implementation of a rules engine may obtain metrics associated with each rule in real-time, and evaluate each defined rule continuously for rule violation thereby. For instance, consider a rule for CPU threshold monitoring for any given application in a cloud platform:

If machine.cpu>60 and machine.cpu<70 then <action>

In accordance with some embodiments, monitoring agents in the cloud platform may send the metric 'machine.cpu', indicating CPU utilization, to a monitoring system at a defined time interval. On receiving this data, the rules engine in the system may evaluate the metric for the violation of the above rule. If a violation is detected, the rules engine may invoke a necessary action request mapped in an associated datastore and place the action request into a request processing lifecycle. In this case the action request may include the addition of a new machine, or computational resource, or it may include moving the at-risk process to another machine, or computational resource, in the cloud system.

Further, as disclosed in the step 310 of FIG. 3, a priority is assigned to the one or more actions to be taken in accordance with the predefined rule. The assignment of priority may be performed by, as in an embodiment disclosed, a prioritization engine.

A prioritization engine may overlook an entire spectrum of application related requests, segment them by system stability factors, such as performance metrics and resource availability, and by business impact factors such as penalties and customer packages, and rank them in accordance with a prioritization policy. For example, one or more requests originating from multiple hosted applications that are contending for the same resource may be identified and their execution optimized and prioritized on the basis of resource usage efficiency. Alternatively, business policies defined by the ASP may be used to identify requests whose execution should be prioritized in case of a resource contention. In an example embodiment, a ranking algorithm may consider resource utilization and availability parameters from an associated Resource-Real-Time-State repository. Such a repository may provide state information about an entire set of system resources to which it is connected, including resource availability in terms of memory, CPU, storage, network and so on. It may additionally provide snapshots of customer and application resource maps at a given point-in-time.

In a preferred embodiment, an optimization engine may apply a ranking for a set of actions mapped to a single application request on the basis of an impact analysis of the set of actions on the computational resources in the cloud platform and the status of other pending requests. Secondly, the optimization engine may consider an extant pool of application requests with a ranked set of actions associated with each of the requests in the pool, and prioritize them in accordance with one or more business policy related metrics, and one or more computational resource availability metrics. Requests may be ordered in a prioritized request list, which thereby captures an optimal business benefit, while minimizing impact on the stability of the cloud platform.

In accordance with an embodiment, parameters used to prioritize action and perform resource contention resolution may include: (1) An SLA class to which the application belongs. (2) A penalty associated with SLA breach. (3) Whether the application is at the threshold of breaching the SLA. (4) Whether the application has already breached the SLA. (5) The number of applications belonging to the same customer that has breached the SLA. (6) The number of applications belonging to the same customer about to breach SLA. (7) The type of action to be performed to rectify a performance affected environment. Priority ranking algorithms may use one or more of these parameters to derive scores. These scores are used to rank each of the actions that contend for the same resources. Actions with relatively high scores are assigned higher priority and are expedited access to resources.

Then, as in a step 312 of FIG. 3, the one or more actions identified are performed in accordance with the assigned priority of each of the one or more actions. Actions may be performed by means of a provisioning engine. The set of steps necessary to enact one or more user or application requests are defined in a provisioning policy. In an example embodiment, the provisioning engine may iterate through the prioritized request list and perform each action in the list that is associated with each end-user, or application, request. Generally, the actions taken may include resource allocation, de-allocation, starting and stopping of application etc. Further, the prioritization engine may update the associated real-time resource state repository with the current set of actions taken. If a set of actions to be performed in connection with a given request fail, the provisioning engine may update the status of the set of actions in a datastore, and send a message to the prioritization engine indicating failure of the set of actions.

Furthermore, in accordance with the provisioning policy, the provisioning engine may determine a sequence of actions corresponding to different components or tiers of an application in case of resource contentions. If, for example, an application start operation requires a resource that is in use by a different application request, then the provisioning engine may interact with the prioritization engine to determine which request should be granted access to the contended resource. This conflict resolution mechanism may be guided by the business policy defined in the prioritization engine.

In an additional embodiment, an audit report may be generated. It is essential to monitor the compliance of SLA because non-compliance may lead to strict penalties. The audit report may forms a basis for strategizing and long term planning for the service provider.

In an additional embodiment, an accounting or billing system may be implemented. Based on the payment model, charge-backs could be made based on the resource utilized by the process during the operation. Fixed and recurring costs may be computed and billed accordingly. Periodically, an amount of cloud platform resources utilized by the application may be calculated by the accounting system. On calculating resource utilization, cost is computed correspondingly and a bill is generated. The bill, and a report on the performance of the application, may be sent to a customer.

The present description includes the best presently-contemplated method for carrying out the present invention. Various modifications to a preferred embodiment will be readily apparent to those skilled in the art and the generic principles of the present invention may be applied to other embodiments, and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

What is claimed is:

1. A system for monitoring and controlling a service level agreement, the system comprising:
   a cloud platform hosting at least one application associated with at least one service level agreement, the cloud platform comprising at least one physical computing unit, at least one networking unit and at least one physical storage unit; and
   a processor in the cloud platform, the processor in operable communication with a processor readable storage medium containing one or more programming instructions whereby the processor is configured to implement:
      a monitoring module, the monitoring module configured to perform the steps of:
         automatically collecting at least one metric relating to an application hosted on the cloud platform, and terms of a service level agreement associated with each of the one or more metrics, wherein each metric is related to at least one of resource failures, operational policies, performance and availability of hosted applications, and performance and availability of a hosting cloud platform;
         continuously monitoring the at least one metric collected against at least one service level objective in the service level agreement, wherein the service level objective is a parameter in the service level agreement that is selected from a group consisting of business and infrastructural parameters related to the cloud platform;
      a controlling module, the controlling module configured to perform the steps of:
         mapping a service level objective to a predefined operation rule;
         identifying one or more actions to be taken in accordance with the predefined operation rule;
         assigning a priority to the one or more actions identified in accordance with the predefined operation rule; and
         performing the one or more actions in accordance with the assigned priority of each of the one or more actions such that an action with a higher priority is performed before an action with a lower priority, wherein performing includes provisioning infrastructural resources associated with the cloud platform.

2. The system as claimed in claim 1, the system comprising a rules engine, the rules engine configured to:
   evaluate the at least one metric collected against at least one predefined operation rule; and
   trigger an action associated with the predefined operation rule when the at least one metric evaluated satisfies a trigger condition.

3. The system as claimed in claim 2, wherein the predefined operation rule is derived from a business related service level objective in the service level agreement or an application related service level objective in the service level agreement, or a cloud platform infrastructure related service level objective in the service level agreement.

4. The system as claimed in claim 2, wherein the trigger condition is linked to a violation of a service level objective in the service level agreement.

5. The system as claimed in claim 1, wherein violation of the terms associated with the service level agreement triggers at least one predefined operation rule whereby conformance with the terms of the service level agreement is enforced.

6. The system as claimed in claim 1, the system comprising a prioritization engine, the prioritization engine configured to:
   receive two or more actions to be taken in accordance with an predefined operation rule associated with each of the two or more actions;
   cache each of the two or more actions; and
   assign a priority to each of the two or more actions received.

7. The system as claimed in claim 6, wherein the priority assigned by the prioritization engine is determined in accordance with a business policy.

8. The system as claimed in claim 1, further comprising an optimization engine, wherein the optimization engine is configured to:
   receive at least one action to be taken in accordance with a predefined operation rule;
   examine an impact of an action to be taken on the operation of all co-hosted applications in the cloud platform;
   order the actions received in accordance with the magnitude of the impact on all co-hosted applications in the cloud platform; and
   send the at least one action to be taken to the controlling module to be performed in accordance with the order determined.

9. The system as claimed in claim 6, wherein the optimization engine is additionally configured to weigh an action received in accordance with the priority assigned to the action.

10. The system as claimed in claim 1, wherein the monitoring module records a violation of a service level objective in a database present in a processor readable storage medium.

11. The system as claimed in claim 1, wherein the monitoring module records a compliance with a service level objective in a database present on a processor readable storage medium.

12. The system as claimed in claim 1, wherein performing is determined in accordance with a provisioning policy.

13. The system as claimed in claim 1, further comprising generating an audit report, wherein the audit report documents a compliance rate with the one or more measures defined in the service level agreement.

14. The system as claimed in claim 1, further comprising incorporating an accounting module that computes fixed and recurring costs associated with cloud platform resource utilization by the hosted application.

15. A computer implemented method for monitoring and controlling a service level agreement, the method comprising:
   automatically collecting at least one metric related to an application hosted on a cloud platform, each metric being related to at least one of resource failures, operational policies, performance and availability of hosted applications, and performance and availability of a hosting cloud platform, the cloud platform hosting at least one application associated with at least one service level agreement and comprising at least one physical computing unit, at least one networking unit and at least one physical storage unit, and terms of a service level agreement associated with each of the one or more metrics;

continuously monitoring the at least one metric collected against at least one service level objective in the service level agreement, wherein the service level objective is a parameter in the service level agreement that is selected from a group consisting of business and infrastructural parameters related to the cloud platform;

mapping a service level objective to a predefined operation rule;

identifying one or more actions to be taken in accordance with the predefined operation rule;

assigning a priority to the one or more actions identified in accordance with the predefined operation rule; and performing the one or more actions in accordance with the assigned priority of each of the one or more actions such that an action with a higher priority is performed before an action with a lower priority, wherein performing includes provisioning infrastructural resources associated with the cloud platform.

16. The method as claimed in claim 15, the method further comprising:
evaluating the at least one metric collected against at least one predefined operation rule; and
triggering an action associated with the predefined operation rule when the at least one metric evaluated satisfies a trigger condition.

17. The method as claimed in claim 16, wherein the predefined operation rule is derived from a business related service level objective in the service level agreement or an application related service level objective in the service level agreement, or a cloud platform infrastructure related service level objective in the service level agreement.

18. The method as claimed in claim 16, wherein the trigger condition is linked to a violation of a service level objective in the service level agreement.

19. The method as claimed in claim 15, wherein violation of the terms associated with the service level agreement triggers at least one predefined operation rule whereby conformance with the terms of the service level agreement is enforced.

20. The method as claimed in claim 15, the method further comprising:
receiving two or more actions to be taken in accordance with an predefined operation rule associated with each of the two or more actions;
caching each of the two or more actions; and
assigning a priority to each of the two or more actions received.

21. The method as claimed in claim 20, wherein the priority assigned is determined in accordance with a business policy.

22. The method as claimed in claim 15, further comprising:
receiving at least one action to be taken in accordance with a predefined operation rule;
examining an impact of an action to be taken on the operation of all co-hosted applications in the cloud platform;
ordering the actions received in accordance with the magnitude of the impact on all co-hosted applications in the cloud platform; and
sending the at least one action to be taken to the controlling module to be performed in accordance with the order determined.

23. The method as claimed in claim 22, further comprising assigning a weight to an action received in accordance with the priority assigned to the action.

24. The method as claimed in claim 15, further comprising recording a violation of a service level objective in a database present in a processor readable storage medium.

25. The method as claimed in claim 15, further comprising recording a compliance with a service level objective in a database present on a processor readable storage medium.

26. The method as claimed in claim 15, wherein performing is determined in accordance with a provisioning policy.

27. The method as claimed in claim 15, further comprising generating an audit report, wherein the audit report documents a compliance rate with the one or more measures defined in the service level agreement.

28. The method as claimed in claim 15, further comprising incorporating an accounting module that computes fixed and recurring costs associated with cloud platform resource utilization by the hosted application.

29. Computer-readable code stored on a non-transitory computer-readable medium that, when executed by a computing device, performs a method for monitoring and controlling a service level agreement, the method comprising, the method comprising:
automatically collecting at least one metric related to an application hosted on a cloud platform, each metric being related to at least one of resource failures, operational policies, performance and availability of hosted applications, and performance and availability of a hosting cloud platform, the cloud platform hosting at least one application associated with at least one service level agreement and comprising at least one physical computing unit, at least one networking unit and at least one physical storage unit, and terms of a service level agreement associated with each of the one or more metrics;
continuously monitoring the at least one metric collected against at least one service level objective in the service level agreement, wherein the service level objective is a parameter in the service level agreement that is selected from a group consisting of business and infrastructural parameters related to the cloud platform;
mapping a service level objective to a predefined operation rule; identifying one or more actions to be taken in accordance with the predefined operation rule;
assigning a priority to the one or more actions identified in accordance with the predefined operation rule; and
performing the one or more actions in accordance with the assigned priority of each of the one or more actions such that an action with a higher priority is performed before an action with a lower priority, wherein performing includes provisioning infrastructural resources associated with the cloud platform.

* * * * *